(12) United States Patent
Sumser et al.

(10) Patent No.: US 8,307,648 B2
(45) Date of Patent: Nov. 13, 2012

(54) COMPRESSOR FOR AN INTERNAL COMBUSTION ENGINE

(75) Inventors: Siegfried Sumser, Stuttgart (DE); Gernot Hertweck, Fellbach (DE); Paul Löffler, Stuttgart (DE); Lionel Le Clech, Stuttgart (DE)

(73) Assignee: Daimler AG, Stuttgart (DE)

( * ) Notice: Subject to any disclaimer, the term of this patent is extended or adjusted under 35 U.S.C. 154(b) by 978 days.

(21) Appl. No.: 12/228,898

(22) Filed: Aug. 15, 2008

(65) Prior Publication Data
US 2009/0013689 A1    Jan. 15, 2009

Related U.S. Application Data

(63) Continuation-in-part of application No. PCT/EP2007/001215, filed on Feb. 13, 2007.

(30) Foreign Application Priority Data

Feb. 17, 2006   (DE) .................. 10 2006 007 347

(51) Int. Cl.
*F02B 33/44* (2006.01)
*F01D 25/24* (2006.01)
(52) U.S. Cl. ............ 60/611; 60/597; 60/598; 415/58.4; 415/914; 415/196

(58) Field of Classification Search .................. 60/599, 60/605.2, 597, 598, 611; 415/58.4, 914, 415/196, 150
See application file for complete search history.

(56) References Cited

U.S. PATENT DOCUMENTS

| 5,333,990 A * | 8/1994 | Foerster et al. ............... 415/58.4 |
| 2005/0188693 A1* | 9/2005 | Schmid et al. ................. 60/599 |

FOREIGN PATENT DOCUMENTS

| GB | 2319304 A * | 5/1998 |
| JP | 2002-534626 | 10/2002 |

\* cited by examiner

*Primary Examiner* — Mary A Davis
(74) *Attorney, Agent, or Firm* — Klaus J. Bach

(57) ABSTRACT

In a compressor of a turbocharger of an internal combustion engine comprising a housing with an inflow channel; a compressor impeller arranged in the inflow channel; and a bypass channel which has a first flow opening upstream of the compressor impeller inlet, a second flow opening downstream of the compressor impeller inlet and an axial annular chamber which connects the first and the second flow openings. An axial vane structure is provided in the axial annular chamber of the bypass channel, which imparts a swirl direction corresponding to that of the air mass flow in the inflow channel to the air mass flowing through the bypass channel from the second to the first flow opening.

11 Claims, 3 Drawing Sheets

COMPRESSOR FOR AN INTERNAL COMBUSTION ENGINE

This is a Continuation-in-Part Application of pending international patent application PCT/EP2007/001215 filed Feb. 13, 2007 and claiming the priority of German patent application 10 2006 007 347.9 filed Feb. 17, 2006.

BACKGROUND OF THE INVENTION

The invention relates to an exhaust gas turbocharger with a compressor for an internal combustion engine, the compressor having a compressor inlet and a bypass channel for recirculating partially compressed air to the compressor inlet.

An exhaust gas turbocharger of an internal combustion engine has an exhaust gas turbine which is arranged in the engine exhaust gas duct and is driven by the exhaust gases of the internal combustion engine, and a compressor in the intake duct of the engine with a compressor impeller which is driven by the turbine via a shaft. Combustion air is fed at atmospheric pressure to the compressor impeller via an inflow channel, which combustion air is compressed to an increased charge pressure by the compressor and then supplied to the cylinders of the internal combustion engine.

The development of supercharged internal combustion engines of this type with a desired torque behavior increasingly requires widened compressor characteristic diagram or performance graph ranges both for commercial vehicles and for passenger vehicles. The compressor characteristic diagram, in which the total pressure ratio (ratio of the output pressure to the input pressure of the compressor) is plotted with respect to the mass throughput, is limited firstly by the pumping limit of the compressor, that is to say the minimum possible volumetric delivery, and secondly by the choke limit of the compressor, that is to say the maximum possible volumetric delivery. Stable operation of the internal combustion engine at constant rotational speeds is possible between the pumping limit and the choke limit. In the case of lower mass throughputs, that is to say before reaching the pumping limit, stable operation of the internal combustion engine cannot be carried out because of pump surges. The exhaust gas turbocharger is often damaged in this connection, often after only a short operating time.

Measures to stabilize the characteristic diagram have therefore been developed for some time, which measures also make it possible to shift the pumping limit position to lower mass throughputs, as a result of which the drive torque and the acceleration torque or the maximum possible engine torque of the internal combustion engine can be increased significantly.

It is proposed as a measure to stabilize the performance graph to provide a bypass channel in the form of an annular gap within the compressor housing around the wheel contour of the compressor impeller parallel to the inflow channel. The bypass channel usually comprises a first flow opening upstream of the inlet edge of the compressor impeller, a second flow opening downstream of the inlet edge of the compressor impeller and an annular chamber which connects these two flow openings. The bypass channel which extends parallel to the inflow channel results in bypass mass flows which, in comparison with structurally identical apparatuses without a bypass, make a shift possible toward smaller or larger mass flows in the region of the pumping limit and in the region of the choke limit.

An exhaust gas turbocharger having a compressor of this type with a bypass channel is described, for example, in DE 196 47 605 C2. In this case, the opening regions of the first and the second flow openings of the bypass channel are additionally of variable design, so that the compressor characteristic diagram can be further optimized near the pumping limit and/or the choke limit.

A further exhaust gas turbocharger of this type is known from DE 198 23 274 C1. In this compressor, an additional wall element is provided for adjusting the opening region of the first flow opening of the bypass channel upstream of the compressor impeller inlet. Moreover, struts are provided for holding a wall section of the bypass channel so as to form an axial guide vane structure, in order to impart a swirl to the air mass flow through the bypass channel. The document does not contain more detailed information about the construction of said struts.

Furthermore, it is known in this context to arrange a guide vane structure or a plurality of guide vane structures in the inflow channel upstream of the compressor impeller, in order to impart a swirl to the air mass flow, which swirl has a favorable effect on the functional behavior of the compressor impeller, in particular in the limit areas of the compressor characteristic diagram. Arrangements of this type are disclosed, for example, by documents DE 102 33 042 A1, DE 103 29 281 A1 and EP 0 749 520 B1.

It is an object of the present invention to provide a compressor for an internal combustion engine, with an improved bypass channel which provides for a more stable shift of the pumping limit of the compressor and to facilitate an adaptation of the measure which stabilizes the characteristic diagram to a particular internal combustion engine.

SUMMARY OF THE INVENTION

In a compressor of a turbocharger of an internal combustion engine comprising a housing with an inflow channel; a compressor impeller arranged in the inflow channel; and a bypass channel which has a first flow opening upstream of the compressor impeller inlet, a second flow opening downstream of the compressor impeller inlet and an axial annular chamber which connects the first and the second flow openings. An axial vane structure is provided in the axial annular chamber of the bypass channel, which imparts a swirl direction corresponding to that of the air mass flow in the inflow channel to the air mass flowing through the bypass channel from the second to the first flow opening.

The axial vane structure in the annular chamber of the bypass channel provides for a mass air flow from the first flow opening of the bypass channel into the inlet channel, which mass air flow has a relieving effect together with the main mass flow in the outer circumferential region of the compressor impeller inlet. Aerodynamic relief of this type of the outer blade region of the compressor impeller means largely prevents flow delaminations, which makes a stable operation of the compressor possible even at lower mass throughputs, that is to say, in particular, in the region of the pumping limit.

In a preferred embodiment of the invention, a narrowest flow cross section of the axial guide vane structure is smaller than, or equal to, a flow cross section of the second flow opening of the bypass channel. This stipulation dampens the sensitivity of the effect of the second flow opening of the bypass channel, since the sensitive flow cross section of the bypass channel which determines the throughput lies in the narrowest flow cross section of the axial guide vane structure.

In one preferred refinement of the invention, the axial guide vane structure or its guide vanes is/are curved inward in the air flow direction from the second to the first flow opening of the bypass channel in the circumferential direction of the compressor impeller, in order to impart the above-described desired identical swirl direction.

In one refinement of the invention, the second flow opening of the bypass channel is formed in the overlap region of the compressor impeller. As an alternative, it is formed radially outside the compressor impeller, that is to say downstream of the compressor impeller outlet.

In a further refinement of the invention, the second flow opening of the bypass channel can also be connected to a point downstream of the compressor in the intake section of the internal combustion engine. As an alternative or in addition, it is also possible to connect the second flow opening of the bypass channel to a point of an exhaust gas section of the internal combustion engine, in order to introduce exhaust gases into the annular chamber of the bypass channel.

In a further refinement of the invention, the first flow opening of the bypass channel is delimited in the direction of the inflow channel by a special wall element which introduces the mass air flow from the first flow opening of the bypass channel into the inflow channel with an axial flow component.

It is preferred in this case if the diameter of the radial inner edge of the wall element is smaller than or equal to the diameter of the inflow channel and the diameter of the radial inner edge of the wall element is greater than or equal to the diameter of the compressor impeller inlet.

In one particularly preferred embodiment of the invention, the axial vane structure of the bypass channel is designed as an exchangeable module, with the result that the compressor can be optimized to the respective application and the respective internal combustion engine in a simple way and without modifications to the housing and the like.

The present invention also relates to an exhaust gas turbocharger for an internal combustion engine, which exhaust gas turbocharger has an exhaust gas turbine in the exhaust gas section of the internal combustion engine and a compressor of the above-described type in the intake section of the internal combustion engine.

The invention will become more readily apparent from the following description of preferred exemplary embodiments of the invention described below with reference to the accompanying drawings:

DESCRIPTION OF PARTICULAR EMBODIMENTS

Figure 1:
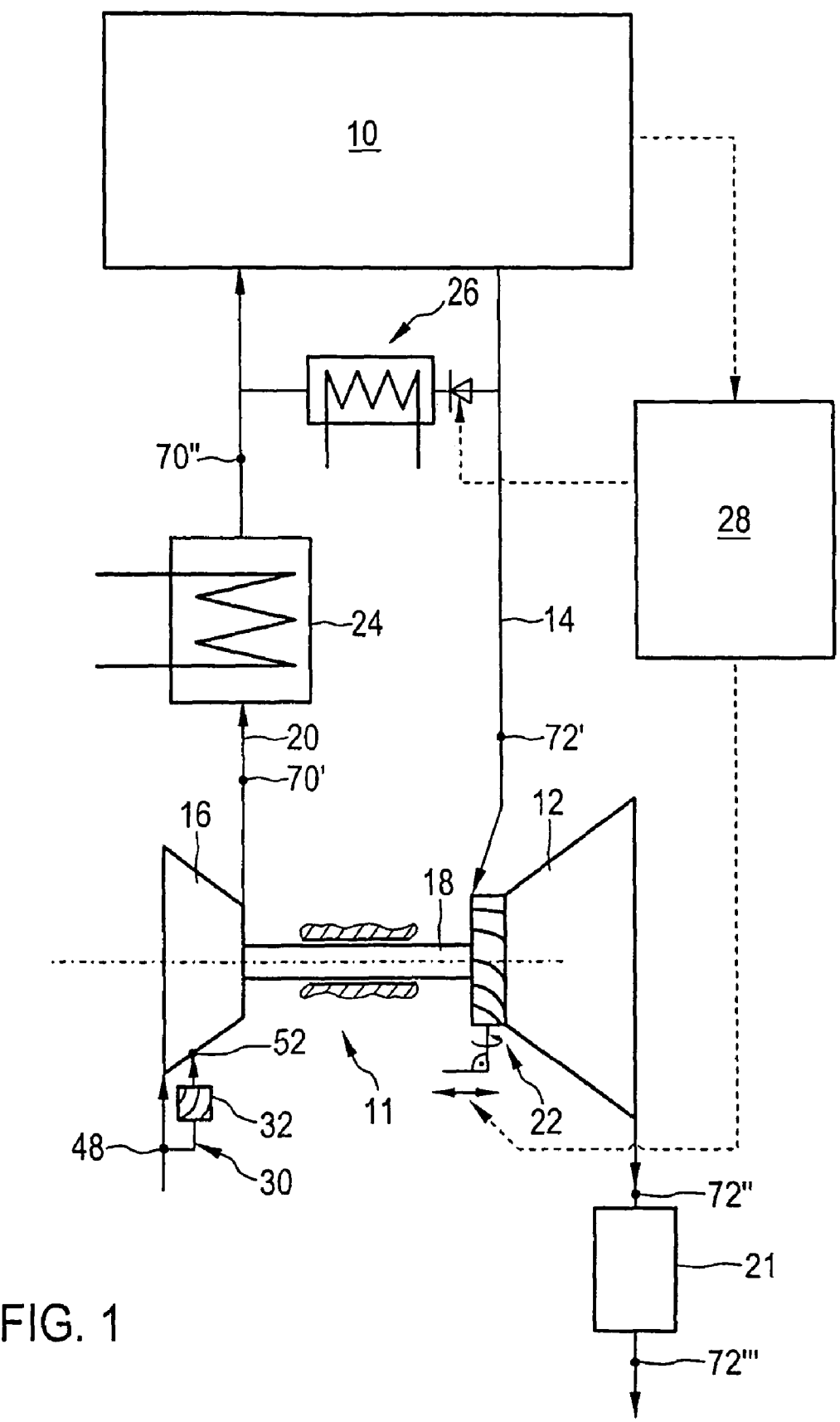
FIG. 1 is a diagrammatic illustration of a supercharged internal combustion engine having an exhaust gas turbocharger with a compressor according to the present invention.

The internal combustion engine 10 as illustrated in FIG. 1 has an exhaust gas turbocharger 11 with an exhaust gas turbine 12 disposed in an exhaust gas section 14 of the internal combustion engine and with a compressor 16 disposed in the intake section 20 of the internal combustion engine. The compressor has an impeller 35 which is driven by the turbine wheel via a shaft 18. During operation of the internal combustion engine 10, the turbine wheel of the exhaust gas turbine 12 is rotated by the exhaust gases which are fed to an exhaust gas aftertreatment device 21. The rotation of the turbine wheel is transmitted by the shaft 18 to the impeller of the compressor 16, which impeller thus sucks in combustion air and compresses it to an increased charge pressure.

The exhaust gas turbine 12 can be provided additionally with a variably adjustable turbine geometry 22 which permits variable setting of the effective flow cross section of the flow passage to the turbine wheel as a function of the current operating state of the internal combustion engine 10. In an analogous manner, the compressor 16 can likewise be equipped with a variable compressor geometry (not shown) which comprises one or more guide vane structures in the inflow region, in order for it to be possible to optimize the flow conditions in the compressor in a wide parameter range.

A charge air cooler 24 is arranged in the intake section 20 downstream of the compressor 16, which charge air cooler 24 cools the compressed charge air before it is fed to the cylinders of the internal combustion engine 10. Furthermore, the internal combustion engine 10 is assigned an exhaust gas recirculation device 26, via which exhaust gases can be recirculated from the exhaust gas section 14 upstream of the exhaust gas turbine 12 into the intake section 20 downstream of the charge air cooler 24. The exhaust gas recirculation device 26 comprises an exhaust gas line between the exhaust gas section 14 and the intake section 20, a valve apparatus and an exhaust gas cooler, as indicated in FIG. 1.

Furthermore, the internal combustion engine 10 is provided with a control unit 28 which controls or adjusts the various assemblies as a function of different operating states of the internal combustion engine 10, in particular the valve apparatus of the exhaust gas recirculation device 26, the variable turbine geometry 22 and the variable compressor geometry.

As a measure which stabilizes the characteristic diagram, the compressor 16 of the exhaust gas turbocharger 11 is provided with a bypass channel 30, in which a special axial guide vane structure 32 is arranged. The construction and the arrangement of this bypass channel 30 with the axial vane structure 32 will be explained in greater detail in the following text with reference to FIGS. 2 and 3.

Figure 2:
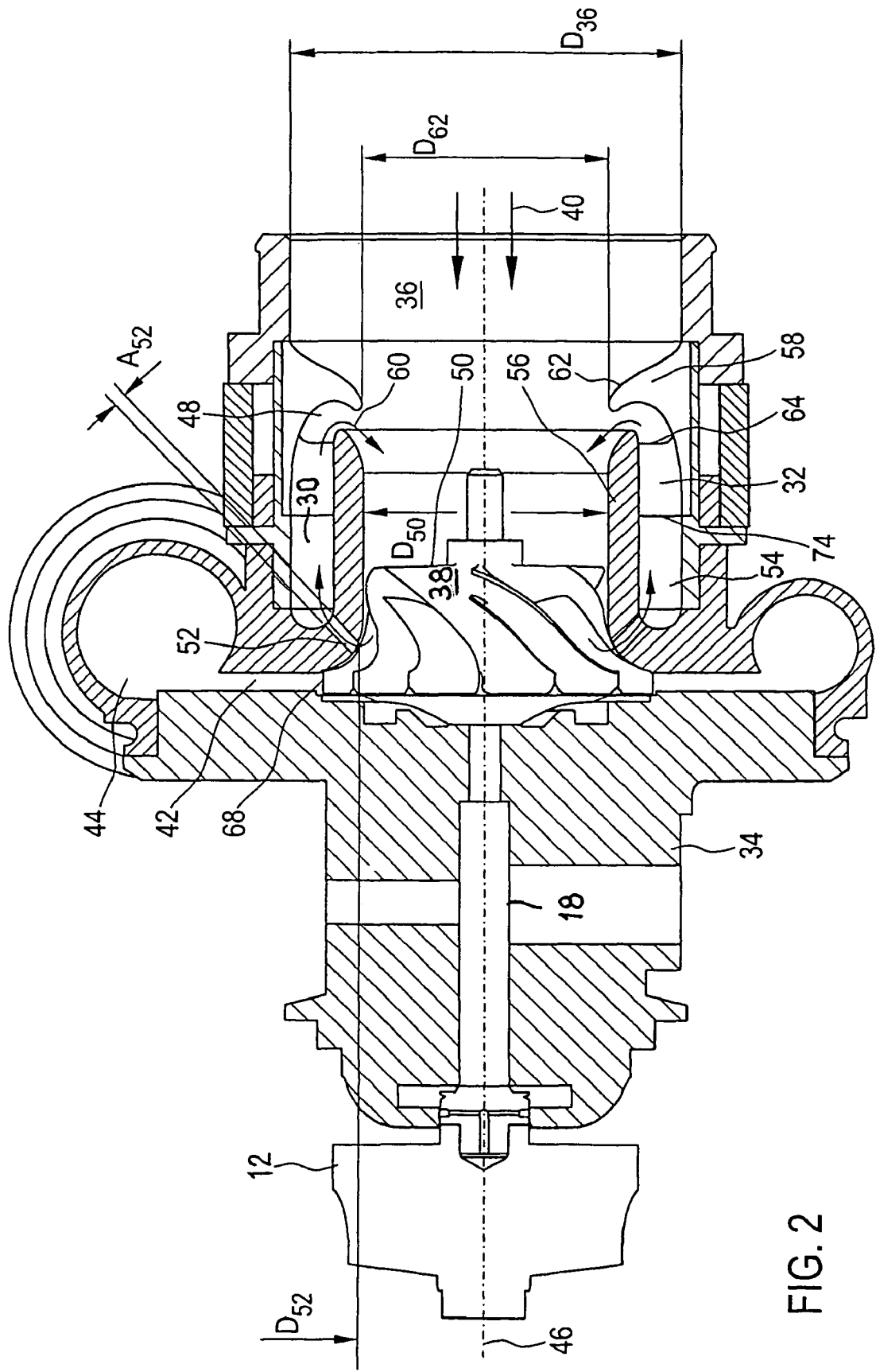
FIG. 2 is a diagrammatic sectional view of a compressor of the exhaust gas turbocharger of FIG. 1 according to a preferred exemplary embodiment.

FIG. 2 shows a section through the compressor part 16 of the exhaust gas turbocharger 11 of FIG. 1. The compressor 16 has a housing 34 with an axially extending inflow channel 36, in which the compressor impeller 38 is arranged which is driven by the exhaust gas turbine 12 via the shaft 18. The compressor impeller 38 sucks in combustion air in the direction indicated by the arrows 40 through the inflow channel 36 and emits it into a spiral channel 44 via a radially extending diffuser 42. The compressed charge air is fed to the cylinders of the internal combustion engine 10 from the spiral channel 44 via the charge air cooler 24.

The bypass channel 30 branches off in the inflow region of the inflow channel 36, which bypass channel 30 is of rotationally symmetrical configuration with respect to the longitudinal axis 46 of the compressor 16 and via which air can be conveyed substantially coaxially with respect to the inflow channel 36. The bypass channel 30 has a substantially radially extending first flow opening 48 upstream of the compressor impeller inlet 50, a second flow opening 52 downstream of the compressor impeller inlet 50 and an axial chamber 54 which connects the first and the second flow openings 48, 52. In the case of the exemplary embodiment which is shown in FIG. 2, the second flow opening 52 is positioned downstream of the compressor impeller inlet 50, but still in the overlap region of the compressor impeller 38. The bypass channel 30 extends substantially concentrically with respect to the inflow channel 36, and the flow openings 48, 52 have the shape of circumferential annular grooves. A wall section 56, which defines the annular chamber 54 and separates the bypass channel 30 from the inflow channel 36, is connected fixedly to the housing 34, for example, via struts (not shown) which stabilize and reinforce the wall section 56 mechanically.

The bypass channel 30 is required, in particular, during operation of the compressor 16 in the region of the pumping limit or the choke limit. During operation near the pumping limit, a part mass flow of the air passes into the annular chamber 54 and through the second flow opening 52 downstream of the compressor impeller inlet 50; it flows through the bypass channel 30 counter to the main flow direction of the combustion air and it is recirculated back into the inflow channel 36 via the first flow opening 48.

As shown in FIG. 2, the first flow opening 48 of the bypass channel 30 is delimited with respect to the inflow channel 36 by a special wall element 58. This wall element 58, which can also optionally be configured or attached so as to be movable, forms an elbow, by which the air flow can be introduced through the bypass channel 30 from the first flow opening 48 into the inflow channel 36 with an axial flow component, as indicated by an arrow 60 in FIG. 2. In other words, the air flow through the bypass channel 30 is deflected by 180° during the introduction into the inflow channel 36. That nozzle contour 62 of the wall section 58 which lies radially on the inside causes the air flow to be guided in a nozzle-like manner to the compressor impeller inlet 50.

In one preferred embodiment of the compressor 16, the diameter $D_{36}$ of the inflow channel 36 upstream of the wall element 58 is greater than, or equal to, the diameter $D_{62}$ of the radially inner edge of the nozzle contour 62 of the wall element 58. Moreover, the diameter $D_{62}$ of the nozzle contour 62 of the wall element 58 is preferably greater than, or equal to, the diameter $D_{50}$ of the compressor impeller inlet 50. Overall, the relationship $D_{36} \geq D_{62} \geq D_{50}$ is preferably valid.

As has already been mentioned above, the axial guide vane structure 32 is provided in the annular chamber 54 of the bypass channel 30. The axial guide vane structure 32 is illustrated in greater detail in FIG. 3. The air mass flow which flows from the second flow opening 52 into the annular chamber 54 is deflected by the axial guide vane structure 32 into a flow direction which is advantageous with the aim of shifting the pumping limit and has an aerodynamic relieve effect together with the main mass flow from the inflow channel 36 after leaving the first flow opening 48 in the outer circumferential region of the compressor impeller inlet 50.

Figure 3:
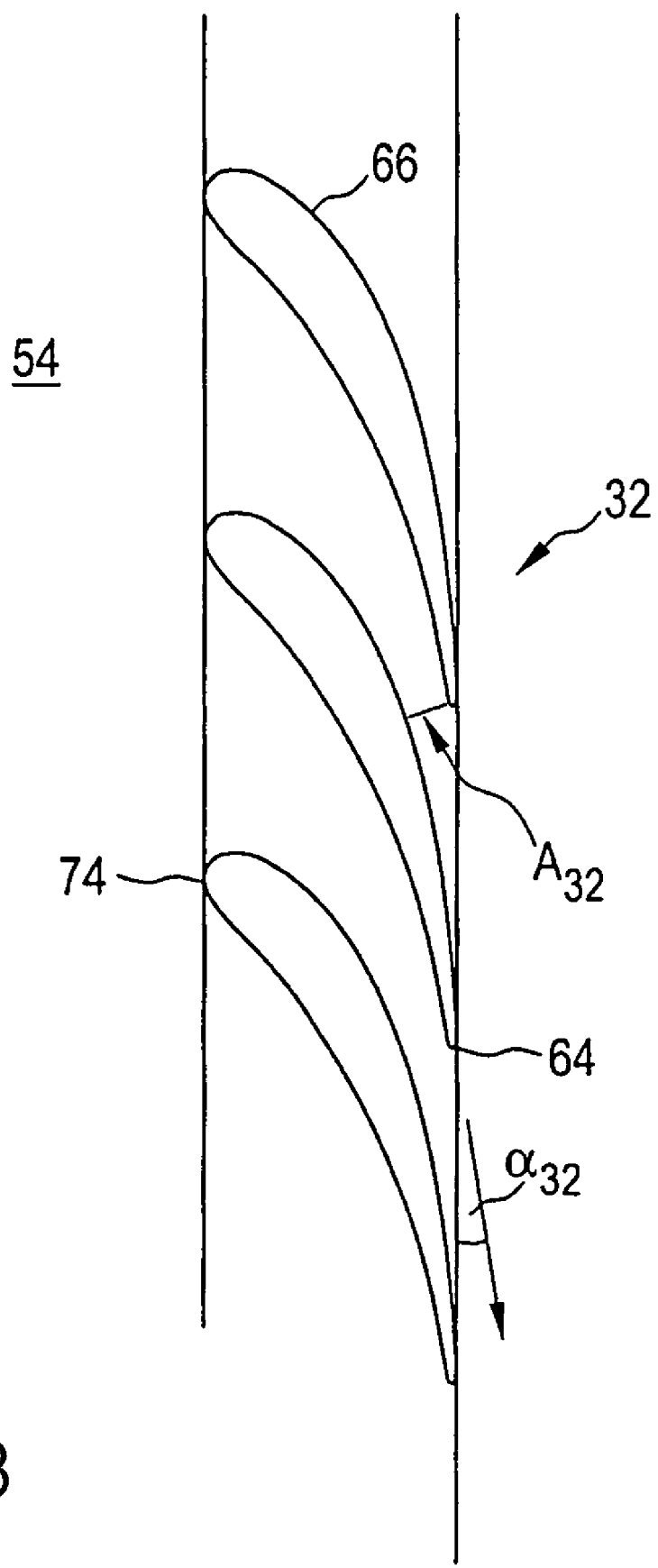
FIG. 3 shows in an enlarged diagrammatic illustration of the design of an axial guide vane structure in the bypass channel of the compressor of FIG. 2.

The air flow in the outer circumferential region of the compressor impeller region 50 has an aerodynamic relief effect when it is given an identical swirl effect, which is brought about by the axial guide vane structure 32 in the annular chamber 54 of the bypass channel 30. The axial guide vane structure outlet 64 which faces the first flow opening 48 of the bypass channel 30 is therefore oriented substantially in the circumferential direction of the compressor impeller 38. In other words, the guide vane elements 66 of the axial guide vane structure 32 are curved radially inward in the air flow direction from the second to the first flow opening 52, 48 of the bypass channel 30 in the direction of the circumferential direction of the compressor impeller 38, as shown in FIG. 3.

The aerodynamic relief of the outer blade region of the compressor impeller 38 which is brought about in this way means largely that flow delaminations are prevented, which makes stable operation of the compressor 38 possible even at low mass throughputs, that is to say in the region of the pumping limit. This effect can be reinforced further by a suitable design of the nozzle contour 62 of the wall element 58.

The axial vane structure 32 in the annular chamber 54 of the bypass channel 30 is preferably configured in such a way that its narrowest flow cross section $A_{32}$ in the vicinity of the axial guide vane structure outlet 64 is smaller than or equal to the flow cross section $A_{52}$ of the second flow opening 52 of the bypass channel 30 ($A_{32} \leq A_{52}$).

This stipulation dampens the sensitivity of the effect of the second flow opening 52. The sensitive flow cross section of the bypass channel 30 which determines the throughput lies in the narrowest flow cross section $A_{32}$ of the axial guide vane structure 32. In order to optimize a damping action or the reduction of disruptions with regard to the oscillation excitation of the impeller inlet 50, a pitch t of the axial vane structure 32 is of variable design over the circumference.

The axial guide vane structure 32 which is constructed in this way can advantageously be designed as an exchangeable module, with the result that the compressor 16 can be optimized to the respective application without modifications to the housing 34 and its surroundings.

In order to obtain a pressure condition from the second flow opening 52 to the axial guide vane structure outlet 64 which drives the air mass flow through the bypass channel 30, the second flow opening 52 is preferably arranged at a higher diameter position $D_{52}$ in comparison with conventional compressors 16 without an axial vane structure 32 in the bypass channel 30.

While the second flow opening 52 in the exemplary embodiment of FIG. 2 is positioned at a position in the overlap region of the compressor impeller 38, it is also conceivable to arrange the second flow opening 52 radially outside the compressor impeller 38, that is to say downstream of the compressor impeller outlet 68. That means that the second flow opening 52 leads, for example, from the diffuser 42 or from the spiral channel 44 at a higher pressure level into the annular chamber 54.

Furthermore, it is also possible that the second flow opening 52 is connected via a channel (not shown) to a tapping point 70' or 70" upstream or downstream of the charge air cooler 24 in the intake section 20. As an alternative or in addition to the above positions of the tapping points 70', 70" and the second flow opening 52, the second flow opening 52 can also be connected to the exhaust gas section 14 of the internal combustion engine 10 via a channel (not shown). Corresponding tapping points 72', 72" and 72'" lie, by way of example, upstream or downstream of the exhaust gas turbine 12 or downstream of the exhaust gas after-treatment device 21. In this way, fresh air and/or exhaust gas can be introduced into the annular chamber 54 of the bypass channel 30.

In combination with the position of the tapping point 70', 70", 72', 72", 72'", the axial vane structure 32 has to be designed in such a way that the generation of a suitable pressure condition and mass throughput through the bypass channel 30 is ensured. This is additionally influenced by the flow cross section $A_{52}$ of the second flow opening 52, the narrowest flow cross section $A_{32}$ of the axial vane structure 32 and the vane structure outlet angle $\alpha_{32}$ (see FIG. 3) which are intended to lead together to the desired identical swirl intensities at the compressor impeller inlet 50.

In the example of FIG. 2, the annular chamber 54 of the bypass channel 30 is of rotationally symmetrical configuration upstream of the axial guide vane structure inlet 74. In order to keep the delamination disruptions low during outflow from the second flow opening 52 in front of the axial guide vane structure inlet 74, considerably larger annular chambers 54 are conceivable as collecting space, however, which can bring about an almost axial guide vane structure flow which is virtually uniform over the circumference.

What is claimed is:

1. A compressor (16) for an internal combustion engine (10), having a housing (34) with an inflow channel (36); a compressor impeller (38) with an inlet (50) arranged in the inflow channel (36); a bypass channel (30) which has a first flow opening (48) upstream of the compressor impeller inlet (50), a second flow opening (52) downstream of the compressor impeller inlet (50) and an axial annular chamber (54) which extends between the first and the second flow openings; an axial guide vane structure (32) arranged in the axial annular chamber (54) of the bypass channel (30) so as to impart to the air flowing through the bypass channel from the second to the first flow opening (52, 48) a swirl corresponding to that of an air mass flow through the inflow channel (36) in the proximity of the pumping limit of the compressor (16), said axial guide vane structure (32) having a narrowest flow cross section ($A_{32}$) which is not larger than a flow cross section ($A_{52}$) of the second flow opening (52) of the bypass channel (30).

2. The compressor as claimed in claim 1, wherein the axial guide vane structure (32) is curved inward in the air flow direction from the second to the first flow opening (52, 48) of the bypass channel (30) in the circumferential direction of the compressor impeller (38).

3. The compressor as claimed in claim 1, wherein the axial flow guide vane structure (32) has a variable pitch t over its circumference.

4. The compressor as claimed in claim 1, wherein the second flow opening (52) of the bypass channel (30) is formed in the overlap region of the compressor impeller (38) with the housing wall section (56).

5. The compressor as claimed in claim 1, wherein the second flow opening (52) of the bypass channel (30) is formed radially outside the compressor impeller (38).

6. The compressor as claimed in claim 5, wherein the second flow opening (52) of the bypass channel (30) is connected to a tapping point (70', 70") downstream of the compressor (16).

7. The compressor as claimed in claim 1, wherein the first flow opening (48) of the bypass channel (30) is delimited in the direction of the inflow channel (36) by a wall element (58) which redirects the air mass flow from the first flow opening (48) of the bypass channel (30) into the inflow channel (36) with an axial flow component.

8. The compressor as claimed in claim 7, wherein the diameter ($D_{62}$) of the radial inner edge of the wall element (58) is not larger than the diameter ($D_{36}$) of the inflow channel (36) upstream of the wall element.

9. The compressor as claimed in claim 7, wherein the diameter ($D_{62}$) of the radial inner edge of the wall element (58) is at least as large as the diameter ($D_{50}$) of the compressor impeller inlet (50).

10. The compressor as claimed in claim 1, wherein the axial guide vane structure (32) of the bypass channel (30) is in the form of an exchangeable module.

11. An exhaust gas turbocharger for an internal combustion engine, having an exhaust gas turbine (12) in the exhaust gas section (14) of the internal combustion engine (10); and a compressor (16) in the intake section (20) of the internal combustion engine, said compressor having a housing (34) with an inflow channel (36); a compressor impeller (38) with an inlet (50) arranged in the inflow channel (36); a bypass channel (30) which has a first flow opening (48) upstream of the compressor impeller inlet (50), a second flow opening (52) downstream of the compressor impeller inlet (50) and an axial annular chamber (54) which extends between the first and the second flow openings; an axial guide vane structure (32) arranged in the axial annular chamber (54) of the bypass channel (30) so as to impart to the air flowing through the bypass from the second to the first flow opening (52, 48) a swirl corresponding to that of an air mass flow through the inflow channel (36) in the proximity of the pumping limit of the compressor (16), said axial guide vane structure (32) having a narrowest flow cross section ($A_{32}$) which is not larger than a flow cross section ($A_{52}$) of the second flow opening (52) of the bypass channel (30).

* * * * *